(12) United States Patent
Roach et al.

(10) Patent No.: US 9,222,494 B2
(45) Date of Patent: Dec. 29, 2015

(54) METHOD AND SYSTEM FOR RAPID DEPLOYMENT OF A CAPPING STACK

(71) Applicant: Halliburton Energy Services, Inc., Houston, TX (US)

(72) Inventors: Sean A. Roach, Houston, TX (US); Doug N. Derr, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 340 days.

(21) Appl. No.: 13/742,188

(22) Filed: Jan. 15, 2013

(65) Prior Publication Data

US 2014/0196884 A1 Jul. 17, 2014

(51) Int. Cl.
*E21B 33/03* (2006.01)
*F16B 2/06* (2006.01)
*E21B 33/038* (2006.01)
*E21B 43/01* (2006.01)

(52) U.S. Cl.
CPC . *F16B 2/06* (2013.01); *E21B 33/03* (2013.01); *E21B 33/038* (2013.01); *E21B 43/0122* (2013.01); *Y10T 24/44009* (2015.01); *Y10T 24/44034* (2015.01); *Y10T 29/49826* (2015.01)

(58) Field of Classification Search
CPC ......... E21B 33/00; E21B 33/02; E21B 33/03; E21B 33/038; E21B 33/06; F16B 2/00; F16B 2/02; F16B 2/06
See application file for complete search history.

(56) References Cited

U.S. PATENT DOCUMENTS

| | | | | |
|---|---|---|---|---|
| 4,218,080 | A * | 8/1980 | Kendrick | 285/347 |
| 4,725,080 | A * | 2/1988 | Josefiak et al. | 285/24 |
| 4,883,293 | A * | 11/1989 | Lawson | 285/364 |
| 7,204,525 | B2 * | 4/2007 | Matzner | 285/367 |
| 8,590,556 | B2 * | 11/2013 | Kendrick | 137/1 |
| 2014/0034337 | A1 * | 2/2014 | Van Wijk | 166/387 |
| 2014/0048731 | A1 * | 2/2014 | Leuchtenberg et al. | 251/1.1 |
| 2014/0123746 | A1 * | 5/2014 | Jaffrey et al. | 73/152.18 |

\* cited by examiner

*Primary Examiner* — Yong-Suk (Philip) Ro
(74) *Attorney, Agent, or Firm* — Scott H. Brown; Baker Botts L.L.P.

(57) ABSTRACT

A capping stack having a first capping stack component and a second capping stack component, and a method for transporting the same are disclosed. The capping stack components are mounted onto standard skids and loaded onto an aircraft. Upon arrival at a location, the skids are mated, and the capping stack components are aligned and coupled. A clamp assembly may be used to create pressure integrity between two capping stack components.

12 Claims, 5 Drawing Sheets

METHOD AND SYSTEM FOR RAPID DEPLOYMENT OF A CAPPING STACK

BACKGROUND

Subterranean operations are typically performed to retrieve hydrocarbons from subterranean formations. An example of such subterranean operations is a drilling operation. When performing drilling operations in a subterranean formation, segments of pipe called casing may be joined and placed in a wellbore drilled to a first intermediate depth to form a casing string. Cement may then be pumped between the casing string and the wall of the wellbore to mechanically hold the casing in place and prevent fluid flow in an annulus formed between the inner wall of the wellbore and outer wall of the casing. In certain applications, it may be desirable to drill the wellbore further into the formation through the casing once the casing has been installed. Before drilling begins through the casing, one or more blowout preventers may be attached to the top of the casing. The blowout preventer may seal the top of the casing should excess pressure be encountered when drilling the wellbore deeper.

Blowout preventers are a type of valve often referred to in the oil and gas industry as "BOPs". BOPs may be used to prevent blowouts during the drilling and production of hydrocarbon wells. A BOP may be installed at the wellhead to prevent the escape of pressure in an annular space between the casing and drill pipe, or in an open hole during drilling and completion operations. During the drilling operation from a drilling platform, the BOP may be located some distance below the drilling rig floor. The drilling platform may include a top drive which is suspended in the drilling derrick structure or a rotary table which is mounted within a circular opening in the floor. The top drive or rotary table is used to turn the drill string and support the drilling string assembly. The BOP may be mounted on top of the casing through which the drill string passes. Typical BOPs are massive structures, often weighing in excess of 300 tons in some deepwater drilling operations, and extending up to 50 feet from the top of the casing.

A capping stack may be used as a secondary closure device in the event of a blowout when the BOP has failed. Capping stacks are typically needed at drilling sites during emergencies (i.e., during a well blowout); therefore, transport and assembly time is of the essence. Capping stacks are currently typically transported to a drilling site using special aircraft (e.g., an Antonov aircraft) that are suited for carrying large components associated with a BOP. However, there are only a limited number of these specialized aircraft available worldwide. Additionally, there are limited areas to land these specialized aircraft. Further, each capping stack component typically has to be customized before each deployment to suit the aircraft. These factors extend the time delays associated with transport and assembly of capping stacks to drilling sites.

Typically, large components of a capping stack are transported individually to the drilling site and erected and pressure tested onboard the drilling platform. The erection and assembly of the capping stack components is referred to herein as "stacking" This stacking operation usually requires laborers to work in very close contact with these large components within a limited space onboard the drilling platform, often as the components are suspended overhead. Additionally, with the limited working height and space onboard the drilling platform, there are few lifting devices that can fit into this space to assist in this operation. Once the capping stack is in place, the equipment must be pressure tested to check its ability to perform properly. If any one of the components fails the pressure testing, the assembly process may have to be repeated to repair or replace the faulty component. This enhances the risks to personnel and the time required to bring the drilling rig to an operational state. Injuries ranging from incidental to serious have been experienced industry-wide due to this operation.

During the various "stacking" and component installation processes, alignment of components is also a critical factor. Virtually all capping stack components are typically assembled with the use of flanges. Consequently, proper alignment must exist between the mating pieces to be able to install gaskets, seals and the bolting required for holding the components together. This requirement is not trivial since the lack of ability to maneuver heavy flanges, one relative to the other, greatly increases the difficulty of installation in a safe and proper manner.

Another concern affecting the capping stacking operation is the lack of preventive maintenance performed on the lifting equipment. The lack of preventive maintenance can lead to the risk of failure of these devices. Since most of these lifting devices reside high off the ground and out of reach, regular maintenance is difficult to perform. This scenario is especially dangerous for the most common lifting devices where wire ropes or chains are the primary lifting means. Left unattended, these components can become prone to failure due to exposure to the inherently corrosive environment in and around the wellbore area.

Since the capping stack is an important piece of safety equipment involved in drilling operations, its functionality is essential. Quick assembly and transport of capping stack components is critical to wellbore operations given that capping stacks are only needed during emergencies. There is a need for a capping stack that is easier and faster to transport to well sites and assemble for use. A capping stack that is transportable on cargo aircraft and is able to be pressure tested at a wellbore location is desirable.

SUMMARY

This disclosure relates to a capping stack having a first and a second capping stack component, and a method for transporting the same. The capping stack components are mounted onto standard skids and loaded onto a cargo aircraft. Upon arrival at a location, the skids are mated and the capping stack components are aligned and coupled. A clamp assembly may be used to create pressure integrity between two capping stack components.

BRIEF DESCRIPTION OF THE DRAWINGS

These drawings illustrate certain aspects of certain embodiments of the present disclosure, and should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drillstring or the hole from the distal end towards the surface, and "downhole" as used herein means along the drillstring or the hole from the surface towards the distal end.

It will be understood that the term "oil well drilling equipment" or "oil well drilling system" is not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

Figure 1:
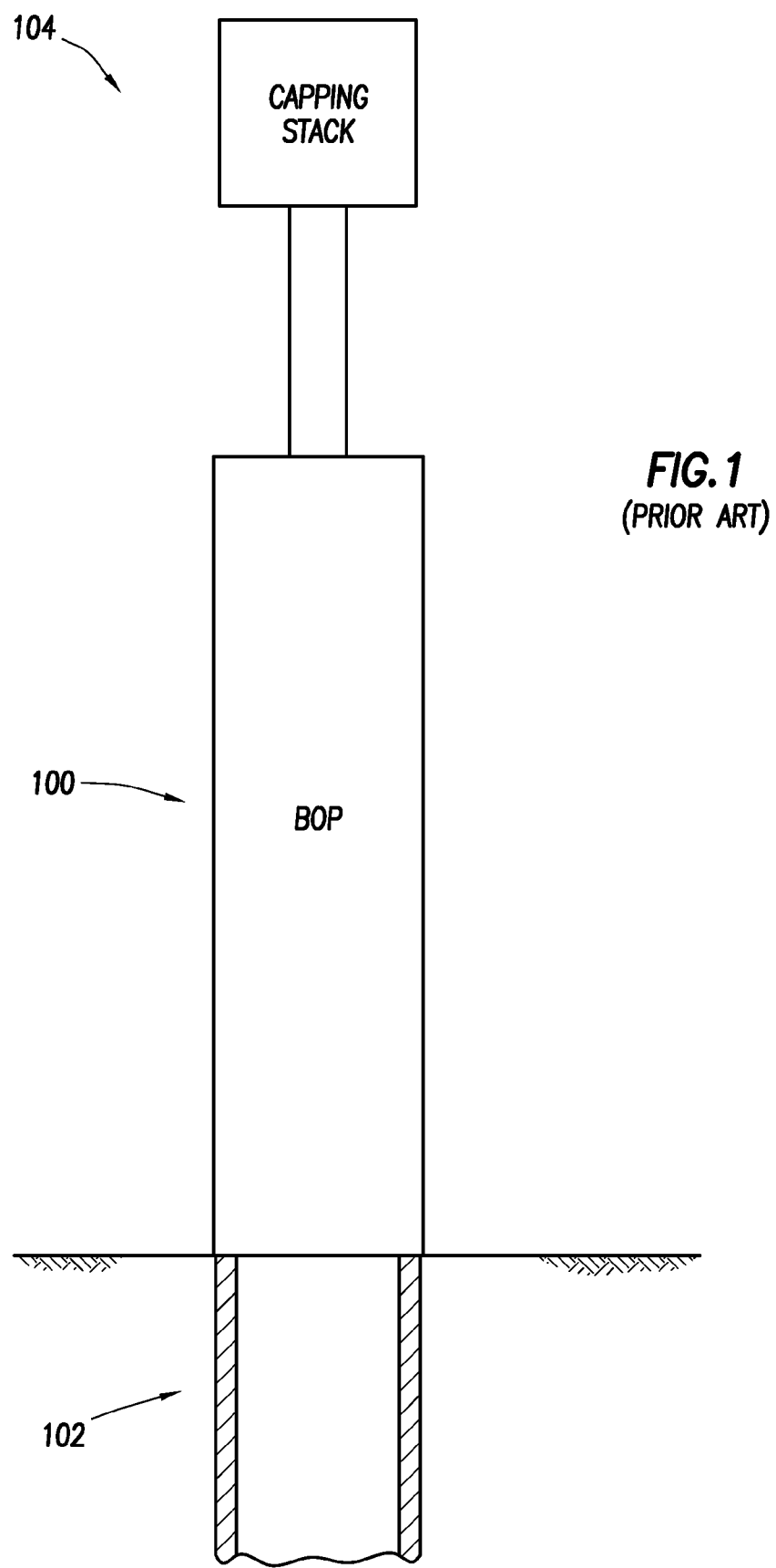
FIG. 1 depicts a BOP and capping stack on the surface of a wellbore or a seabed wellhead, in accordance with the prior art.

Referring now to FIG. 1, a BOP 100 is shown positioned at the wellhead of a subsea wellbore 102 in accordance with the prior art. Once a wellbore 102 is drilled in a formation, a BOP 100 may be positioned at the opening of the wellbore 102. A capping stack 104 is coupled to the BOP 100. The BOP 100 may be used generally to seal, control, and/or monitor the wellbore 102. Specifically, the BOP 100 may be used to prevent a blowout and control the wellbore 102 in the event that a blowout does occur. A blowout may include an erratic wellbore pressure or uncontrolled flow. The capping stack 104 may be used as a secondary closure device in the event of a blowout. The capping stack 104 may be placed on the BOP 100 to provide redundancy and further control in the event of a blowout when the BOP 100 has failed. Typically the BOP 100 is positioned at the opening of the wellbore 102 before drilling operations begin. However, the capping stack 104 may not be transported to the wellsite unless and until the BOP 100 has failed. The capping stack 104 may be transported to the wellsite as a single unit via an Antonov aircraft or other like aircraft capable of handling heavy loads. The aircraft may need to be customized in order to facilitate transportation of the capping stack 104 to the wellsite.

Figure 2:
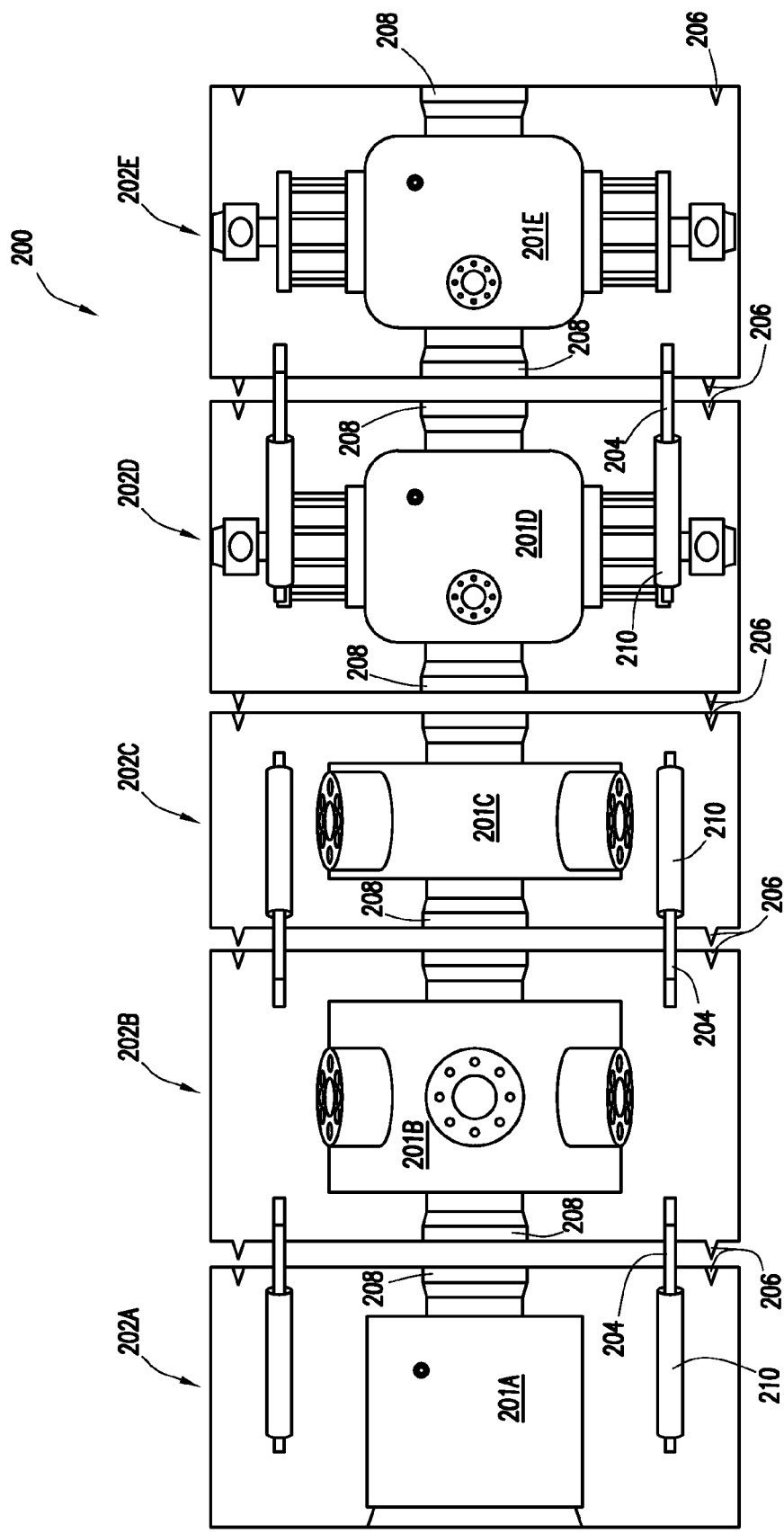
FIG. 2 depicts components of a capping stack in accordance with an illustrative embodiment of the present disclosure.

Referring now to FIG. 2, a capping stack in accordance with an implementation of the present disclosure is shown generally with reference numeral 200. The capping stack 200 includes several capping stack components 201A-E. Each capping stack component 201A-E is mounted onto a standard skid 202A-E for transportation. For example, a first capping stack 201A may be mounted onto a first standard skid 202A and a second capping stack 201B may be mounted onto a second standard skid 202B. The term "standard skid" as used herein refers to a skid design with a given common length, common width, and common height—dimensions that form skids 202A-E of the same geometric shape. Each skid 202A-E may be designed to interface directly with predefined aircraft structural members. In one illustrative embodiment, each skid 202A-E may be rectangular in shape and approximately 12 feet long and approximately 6 feet wide. However, the skids 202A-E may be a different size and shape without departing from the scope of this disclosure. The skids 202A-E are suitable to load, secure, transport, and unload from any suitable cargo aircraft such as a Boeing 747 or Antonov An-124 or An-225. The term "cargo aircraft" as used herein means a fixed-wing aircraft designed or converted for the carriage of goods, rather than passengers. Cargo aircraft may be devoid of passenger amenities and generally feature one or more large doors for loading and unloading cargo. Further, cargo aircraft, as compared to Antonov aircraft previously used to transport capping stacks to wellsites, may include lighter aircraft with greater access to landing strips, thus creating improved response time by reducing the requirement for ground transportation. The skids 202A-E may be loaded onto one or more cargo aircraft. The skids 202A-E may mate to the structural members of the cargo aircraft without the need for customization of the aircraft or the skids 202A-E, thus cutting down on response time to a desired wellbore location. Each aircraft model may have multiple pallet positions inside the cargo hold area. The combined weight of each skid 202A-E and contents is limited to the allowable load limit of the assigned pallet position. This may speed up the deployment process as air cargo crews may place and secure the skids 202A-E on the aircraft more rapidly, eliminating the need for case-by-case custom loading arrangements. The standardized skid size may be suitable to or compatible with the cargo aircraft load securing attachment points, loading door sizes, and aircraft cargo deck support load limits.

The capping stack 200 is loaded onto the cargo aircraft and transported as separate capping stack components 201A-E. The capping stack components 201A-E must be aligned, reconnected, assembled, and pressure tested when the aircraft arrives at a landing location but before the capping stack 200 is deployed to a wellsite. The landing location is selected for proximity to the location of an incident that necessitated the utilization of the capping stack. The use of the improved capping stack 200 provides the capability to unload and handle the capping stack components 201A-E in transit to the designated wellsite. Once the aircraft arrives at the landing location, the skids 202A-E may be removed from the aircraft.

In order to align the capping stack components 201A-E, well control crews may utilize either overhead cranes or forklift trucks to stage the skids 202A-E at a predetermined distance (e.g., within 6-12 inches) of each other with the male and female wedge mechanisms 206 facing each other.

Once this initial alignment is complete, the skids 202A-E must be coupled, or assembled, which may require high capacity material handling equipment. This equipment may be in short supply. Material handling equipment may include, but is not intended to be limited to, cranes, forklifts, and other large machines. Also, the skid assembly must occur in a safe zone where material handling equipment operations are restricted to ensure personnel safety. Once the skids 202A-E are placed in close proximity to each other, the material handling equipment is moved to a safe distance to allow greater personnel movement. The skids 202A-E may be coupled using the hydraulic mechanisms 204 and without the use of material handling equipment lift limitations. Specifically, a clevis attachment 210 is located at the top corner of each skid 202A-E. Each clevis attachment 210 may have an end connector hole (not shown), which allows an extended hydraulic mechanism 204 to be attached. The hydraulic mechanism 204 may couple two skids 202A-E by connecting their respective clevis attachments 210. Any suitable mechanisms known to those of ordinary skill in the art may be used to actuate the hydraulic mechanisms 204. For instance, in certain embodiments, a hydraulic pump (not shown) may be connected to each of the hydraulic mechanisms 204, which may each be equipped with a flow diverter (not shown). The hydraulic pump used may be a hydraulic pump of any known type, including, but not limited to, a manual pump or pneumatic pump. The flow diverter may allow synchronous activation of both hydraulic mechanisms 204 by manipulation of the hydraulic pump. Specifically, the flow diverter may allow a single incoming fluid stream to be divided into multiple outflows with each outflow having approximately equal volume. This permits both hydraulic mechanisms 204 to operate in parallel.

Once a closing pressure is applied to the hydraulic mechanisms 204, the skids 202A-E are pulled together to create alignment of the skids 202A-E. This alignment allows the creation of wellbore connection pressure between the capping stack components 201A-E. In certain embodiments, male and female wedge mechanisms 206 may be used to mate the skids 202A-E as the hydraulic mechanisms 204 pull the skids 202A-E together.

In order to create pressure integrity among the capping stack components 201A-E, clamps 208 or other suitable engagement means known to those of ordinary skill in the art may be used. The term "pressure integrity" as used herein means a durable pressure seal at the flange connection interface. A pressure integrity test may verify that a pressure vessel has no pressure leaks or loss of pressure containing ability. The performance of such pressure integrity tests are well known to those of ordinary skill in the art and will therefore not be discussed in detail herein.

Figure 3:
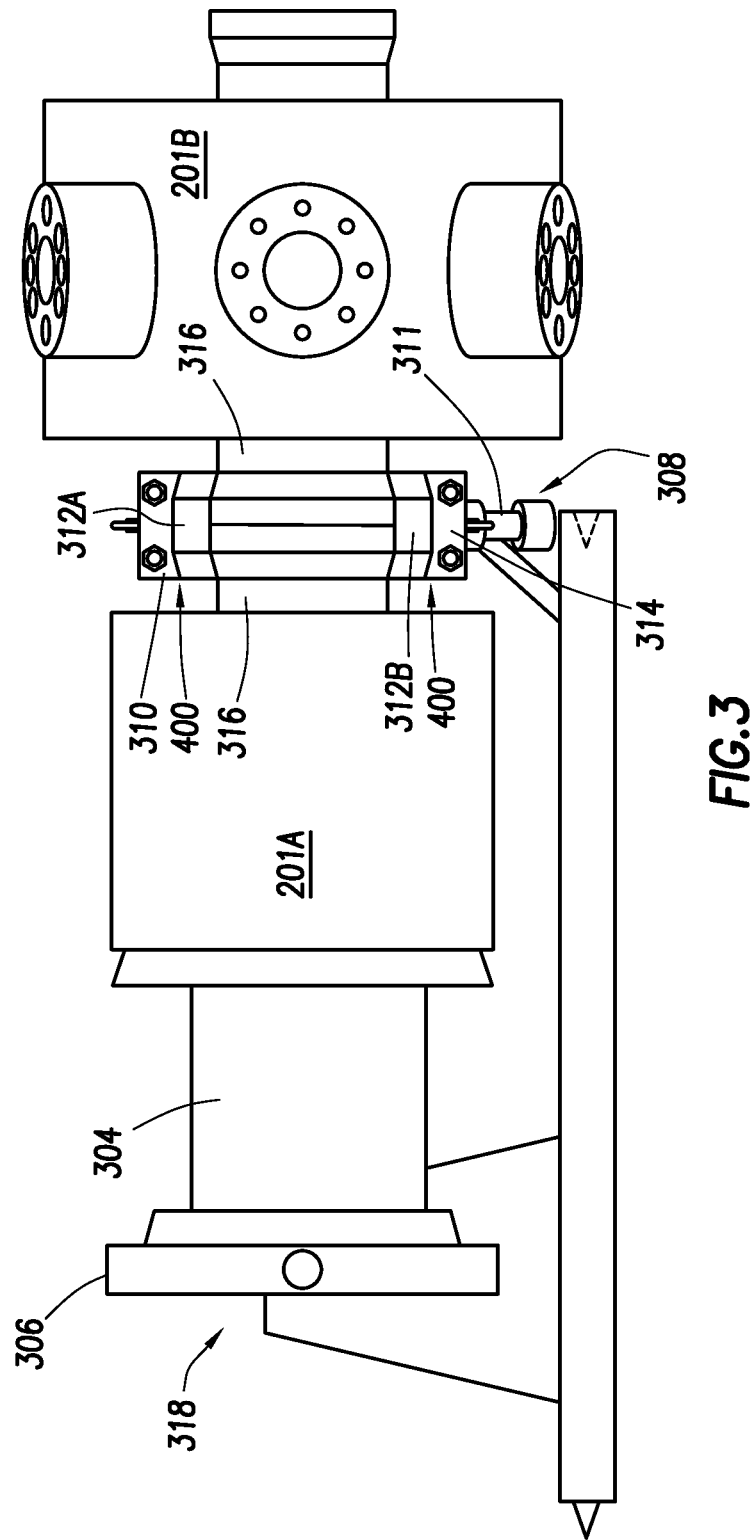
FIG. 3 depicts part of a capping stack in accordance with an illustrative embodiment of the present disclosure in a horizontal position.

Referring now to FIG. 3, a capping stack component 201B is shown in a horizontal position. A wellhead connector 201A is one type of capping stack component 201. The wellhead connector 201A operates to hydraulically seal the wellbore. In FIG. 3, the capping stack component 201B is coupled to the wellhead connector 201A. The wellhead connector 201A operates to couple the capping stack 200 to the wellbore when the capping stack 200 reaches the wellsite. A wellhead mandrel 304 couples the wellhead connector 201A to a pressure test stump 306. While the capping stack component 201B is in the horizontal position, a clamp installation mechanism 308 is operated. The clamp installation mechanism 308 operates to install a bottom clamp half 314 of a clamp assembly 400 (shown in more detail in FIG. 4), which operates to create pressure integrity between two capping stack components— for example, the capping stack component 201B and the wellhead connector 201A, or between the capping stack component 201B and a second capping stack component 201C (shown in FIG. 2). The clamp assembly 400 may be installed while the capping stack component 201B is in a horizontal position. The clamp assembly 400 may include a top clamp half 310 and a bottom clamp half 314. The clamp installation mechanism 308 may utilize a saddle 311, which may cradle the bottom clamp half 314 in a ready position. Thus, the clamp installation mechanism 308 and the bottom clamp half 314 are coupled. The saddle 311 is a system of linkages and hydraulic mechanisms which allow the use of a hydraulic pump to raise the bottom clamp half 314 into an installation position once the capping stack component 201B has been aligned with the wellhead connector 201A (or once two capping stack components 201B-E have been aligned, in the instance that two capping stack components 201B-E are being coupled). The linkages allow the saddle 311 and the bottom clamp half 314 to move vertically upward and downward together when the hydraulic pump is operated.

The bottom clamp half 314 may remain below the lower hub connection 312A while two hubs 316 are pulled together, or mated. The bottom clamp half's 314 sides, edges, and ends do not interfere the mating of the hubs 316. After the hubs 316 are mated, a support and alignment carrier (not shown) containing the bottom clamp half 314 is elevated until the bottom clamp half 314 contacts the mated hubs 316. The support and alignment carrier may be elevated by any suitable means, such as, for example, a hydraulic jack extending upwards or a mechanical scissor arrangement. The bottom clamp half 314 and top clamp half 310 may be coupled to the outside diameter of the mated hubs 316, providing a clamping force to the hubs 316 and creating a mechanical connection. The top clamp half 310 may then be fitted with a plurality of fasteners 420 (not shown in FIG. 3 but shown in FIG. 4) and aligned and lowered onto the upper hub connection 312B. The fasteners 420 may then be drawn tight. The term "fasteners" as used herein may include, but is not limited to, studs or any known means for coupling. A clamp assembly (including the bottom clamp half 314 and the top clamp half 310) may create pressure integrity between each pair of capping stack components 201A-E. This process then may be repeated for each pair of capping stack components 201A-E that may make up the capping stack 200. The capping stack components 201A-E that may make up the capping stack are selectable and customizable by the user, depending on the needs of the wellsite.

Figure 4:
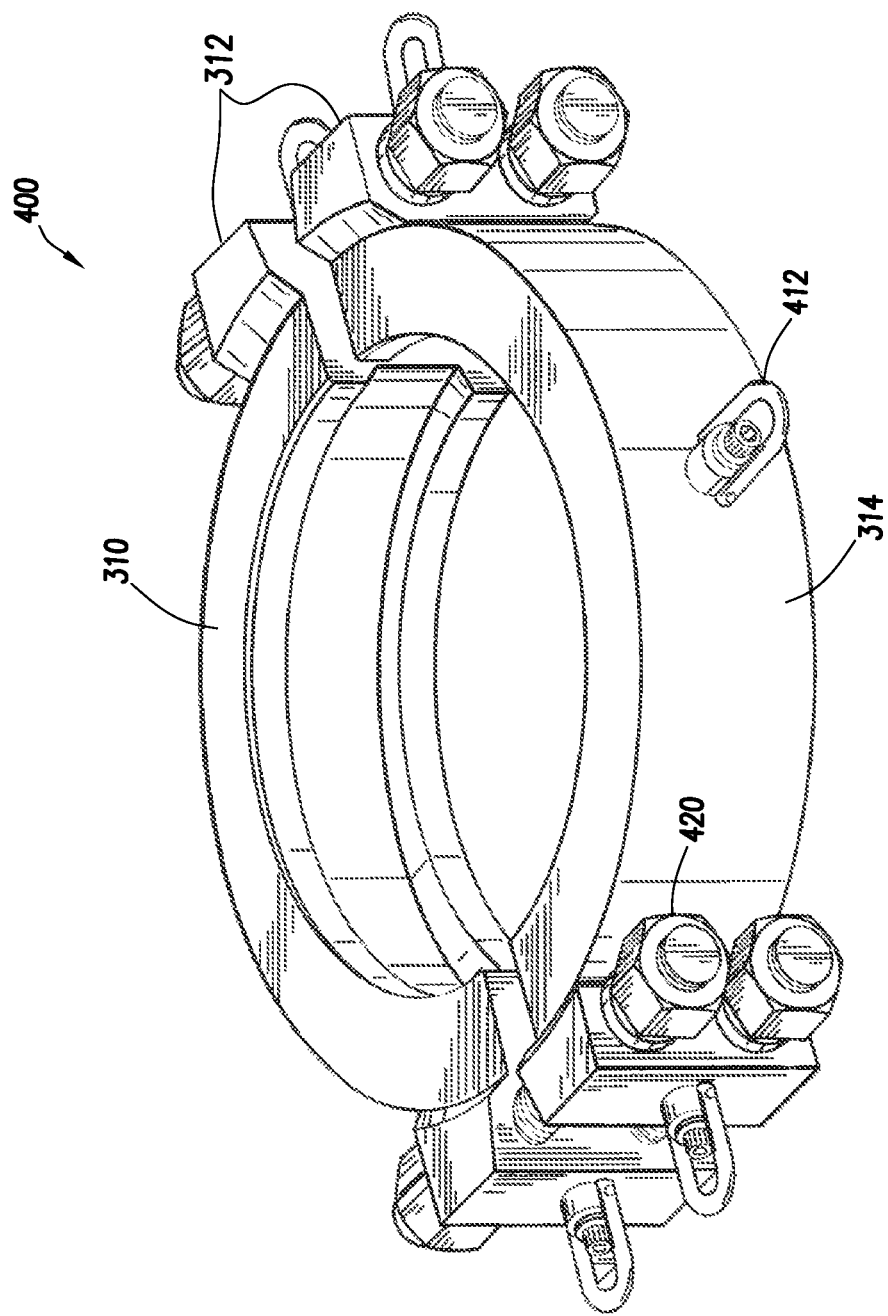
FIG. 4 depicts a clamp assembly in accordance with an illustrative embodiment of the present disclosure.

A clamp assembly 400 as described above in accordance with an illustrative embodiment of the present disclosure is shown in further detail in FIG. 4. The top clamp half 310 and the bottom clamp half 314 are pulled together and secured with fasteners 420 at the hub connection 312 as discussed above. A swivel lifting eye 412 may be used to lift or lower the clamp assembly 400.

Figure 5:
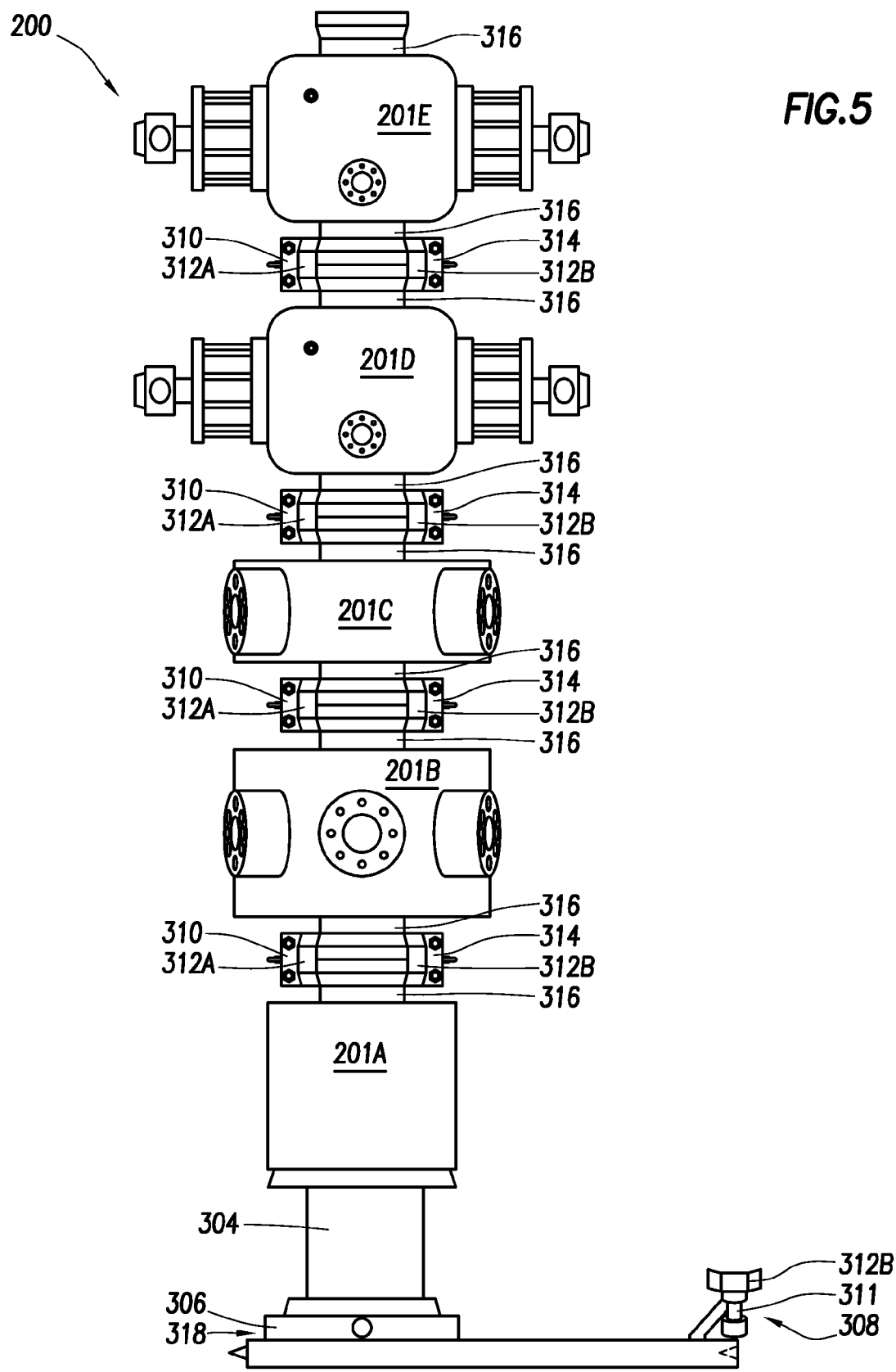
FIG. 5 depicts a capping stack in accordance with an illustrative embodiment of the present disclosure in a vertical position.

Once all the necessary capping stack components 201A-E have been aligned, connected, and clamped, the capping stack 200 may be lifted using a crane or other machinery to a vertical position as shown in FIG. 5 in order for pressure testing to be completed. The capping stack 200 may be lifted from a horizontal position to a vertical position about a fixed horizontal-to-vertical pivot system 318. The horizontal-to-vertical pivot system 318 may utilize one or more hinges or other suitable means known to those of ordinary skill in the art. The horizontal-to-vertical pivot system 318 may include a pressure test stump 306 as a structural member. This allows the capping stack 200 to be raised to a vertical position with a crane or other machinery and immediately filled with water for pressure testing without breaking any connections, rigging up, or engaging in any additional heavy lifts.

Referring now to FIG. 5, the assembled capping stack 200 is shown in a vertical position. When in the vertical position, the capping stack 200 may be pressure tested. For instance, water may be poured into the top of the capping stack 200 so that the capping stack 200 is filled with water. The capping stack 200 may then be sealed at the top and a pressure test may be performed. Pressure testing may be performed subject to industry and regulatory requirements. Industry practices for pressure testing may be followed after the capping stack 200 is assembled and is in the vertical position. The pressure test stump 306 is used to pressure test the capping stack 200 while it is in a vertical position. Finally, once the capping stack 200 has been successfully pressure tested, it may be deployed to a wellsite. Machinery such as a heavy crane or drilling hoist may be used to lift and deploy the capping stack 200 to the wellsite. Pressure testing may be performed close to an ocean port so that the capping stack 200 may be loaded on a suitable ocean vessel for transport to the incident site, if the incident site is a subsea wellbore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method of transporting a capping stack having a first capping stack component and a second capping stack component to a wellbore location comprising:
    mounting the first capping stack component onto a first standard skid and mounting a second capping stack component onto a second standard skid;
    loading the first standard skid and the second standard skid onto an aircraft;
    mating the first standard skid and the second standard skid to a corresponding structural member of the aircraft;
    removing the first standard skid and second standard skid from the aircraft after the aircraft arrives at a landing location;
    aligning the first capping stack component and the second capping stack component;
    coupling the first capping stack component and the second capping stack component;
    performing a fluid pressure integrity test on a connection between the first capping stack component and the second capping stack component;
    deploying the first capping stack component and the second capping stack component to the wellbore location; and
    lifting the first capping stack component and the second capping stack component about a horizontal-to-vertical pivot system, wherein the horizontal-to-vertical pivot system comprises a hinge and a pressure test stump.

2. The method of claim 1, wherein coupling the first capping stack component and the second capping stack component comprises operating a hydraulic mechanism to pull the first standard skid and the second standard skid together.

3. The method of claim 1, wherein aligning the first capping stack component and the second capping stack component comprises operating a wedge mechanism.

4. The method of claim 1, wherein coupling the first capping stack component and the second capping stack component further comprises:
    operating a clamp assembly;
    wherein the clamp assembly installs a bottom clamp half and a top clamp half between two capping stack components while the capping stack components are in a horizontal position.

5. The method of claim 4, wherein the clamp assembly creates fluid pressure integrity between two capping stack components.

6. The method of claim 1, further comprising:
    testing a connection between the first capping stack component and the second capping stack component for fluid pressure integrity, wherein the capping stack is in a vertical position.

7. A capping stack, comprising:
    a first capping stack component and a second capping stack component;
    a connector between the first capping stack component and the second capping stack component for fluid pressure integrity, wherein the capping stack is in a vertical position;
    a first standard skid and a second standard skid, wherein the first capping stack component is mountable onto the first standard skid and the second capping stack component is mountable onto the second standard skid for transportation to a wellbore;
    a hydraulic mechanism coupled to the first and second standard skids, wherein the hydraulic mechanism is operable to pull the first and second standard skids together; and
    a horizontal-to-vertical pivot system coupled to the first capping stack component, wherein the horizontal-to-vertical pivot system comprises a hinge and a pressure test stump.

8. The capping stack of claim 7, wherein the first standard skid and the second standard skid are transportable by an aircraft.

9. The capping stack of claim 7, further comprising a clamp assembly, wherein the clamp assembly comprises:
    a bottom clamp half;
    a top clamp half;
    a hub connection; and
    a fastener,
        wherein the fastener couples the bottom clamp half and top clamp half at the hub connection, and
        wherein the clamp assembly couples the first capping stack component to the second capping stack component.

10. The capping stack of claim 9, wherein the clamp assembly is installed while a capping stack component is in a horizontal position.

11. The capping stack of claim 9, further comprising a clamp installation mechanism coupled to the bottom clamp half.

12. The capping stack of claim 11, wherein the clamp installation mechanism further comprises a hydraulic mechanism, wherein the hydraulic mechanism is operable to raise and lower the bottom clamp half.

* * * * *